United States Patent [19]

Hodek et al.

[11] Patent Number: 4,599,398
[45] Date of Patent: Jul. 8, 1986

[54] A METHOD OF MOLDING POLYMERIZABLE COMPOSITION COMPRISING LACTAM MONOMER, CATALYST AND INITIATOR

[75] Inventors: Robert B. Hodek, Gibsonia; Jerome A. Seiner, Pittsburgh, both of Pa.

[73] Assignee: PPG Industries, Inc., Pittsburgh, Pa.

[21] Appl. No.: 652,699

[22] Filed: Sep. 21, 1984

Related U.S. Application Data

[62] Division of Ser. No. 518,161, Jul. 28, 1983, Pat. No. 4,501,821.

[51] Int. Cl.$^4$ ............................................. C08G 69/20
[52] U.S. Cl. .................................... 528/312; 525/424; 525/454; 528/314; 528/315; 528/319; 528/323

[58] Field of Search ............... 528/312, 315, 314, 319, 528/323; 525/454, 424

[56] References Cited

U.S. PATENT DOCUMENTS

| 3,234,152 | 2/1966 | Fuller | 528/312 |
| 3,366,608 | 1/1968 | Lincoln et al. | 528/315 |
| 3,511,893 | 5/1970 | Schaeffer et al. | 525/454 |
| 3,562,221 | 2/1971 | Steinhofer et al. | 528/312 |
| 3,621,001 | 11/1971 | Steinhofer et al. | 528/315 |

Primary Examiner—Harold D. Anderson
Attorney, Agent, or Firm—Linda Pingitore

[57] ABSTRACT

An improved method of molding involves utilizing as the catalyst and initiator components of a polymerizable composition, a Grignard catalyst and a dual initiator system.

11 Claims, No Drawings

A METHOD OF MOLDING POLYMERIZABLE COMPOSITION COMPRISING LACTAM MONOMER, CATALYST AND INITIATOR

This is a division of application Ser. No. 518,161 filed July 28, 1983, now U.S. Pat. No. 4,501,821.

BACKGROUND OF THE INVENTION

The present invention relates to the production of polyamides by the anionic polymerization of lactams.

Polyamides, particularly polylactams which are a class of polyamides prepared by polymerizing lactam monomers, exhibit a wide range of properties suitable for a variety of applications. Polycaprolactam, such as that available as NYLON 6, is perhaps the most widely used polyamide because it exhibits excellent mechanical and physical properties at a moderate cost.

Polycaprolactam can be polymerized under substantially anhydrous conditions by anionic catalytic polymerization. That is, the process is initiated with a strong base. Such suitable catalysts for the polymerization are lactam anions which can be obtained from lactam-metal compounds having a metal atom, typically an alkali or alkaline earth metal, bound to their nitrogen atom. For example, sodium caprolactamate, potassium caprolactamate, and Grignard compounds such as caprolactam magnesium bromide can be utilized.

The anionic polymerization process can be appreciably accelerated by the addition of an initiator or promoter to the polymerization reactants. For example G.B. No. 1,099,265; G.B. No. 1,067,153; and U.S. Pat. No. 3,308,099 describe the addition of an initiator to accelerate polymerization. The promoters or initiators which have been suggested by the art include, for example, compounds containing a tertiary nitrogen atom to which are bound two or more carbonyl, thio carbonyl, sulfonyl or nitroso groups; compounds which react with a lactam monomer to form one of these aforelisted compounds, for example isocyanates, acid chlorides, or acid anhydrides; and compounds such as bislactams, for example, terephthaloyl bis caprolactam. Polymerization is generally carried out by using a single catalyst in conjunction with a single type of initiator.

Uses of polycaprolactam include the production of fibers, fabrics, as well as molded and laminated articles. For some applications a combination of properties is desirable, for example, impact resistance, stiffness, heat sag resistance, rapid cure and reduced water absorption; hence polymers of polycaprolactam plasticized with various polymeric polyols are generally prepared to suit particular demands. The preparation of these plasticized polymers, however, is not without attendant difficulties. Often, certain desirable properties are diminished, such as rapid cure with a given level of catalyst and initiator. Moreover, other difficulties can arise, for example, the presence of high levels of unreacted lactam monomer can give rise to a malodorous finished product.

Over the years efforts have been directed toward the goals of making the polymerization of lactams a more efficient process and at the same time achieving a multiplicity of desirable properties in the finished product. A simple, economical, and expeditious manner of achieving these goals is needed.

In accordance with the present invention, there is provided a method of molding which comprises:
(I) depositing in a mold a charge of a polymerizable composition, comprising lactam monomer, initiator, and catalyst;
(II) polymerizing the charge while in the mold so as to form an at least partially cured article;
(III) removing the article from the mold; wherein the improvement comprises utilizing as the initiator and catalyst components a Grignard catalyst for lactam polymerization and an initiator system, comprising:
(a) at least one material represented by the following structural formula:

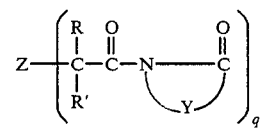

(b) at least one material represented by the following structural formula:

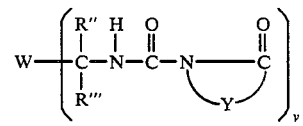

wherein q and v are independently an integer of at least 1; Z and W are independently selected from a compound of polymeric material, said compound being composed of at least two elements in chemical combination which contain up to two repeating structural units, said polymeric material being a macromolecule formed by the chemical union of at least two coreactants and having at least three repeating structural units; with the proviso that at least a portion of either or both the materials (a) or (b) is a polymeric material; R, R', R", R'" are independently hydrogen, a $C_1$ to $C_{10}$ aliphatic radical, $C_3$ to $C_{10}$ cycloaliphatic radical, $C_6$ to $C_{10}$ aryl or alkaryl radical, and independently R and R" and the carbon to which each is attached are included as part of a cycloaliphatic or aromatic ring; and Y is an alkylene group having from 3 to 12 carbon atoms or an alkylene group having from 3 to 12 carbon atoms interrupted by a heteroatom; with the proviso that the equivalent ratio

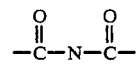

groups to the magnesium of the Grignard catalyst is within the range of from 0.3 to 1 to 4 to 1, and at least 10 percent of the initiator groups of the initiator system are of the (a) type.

Also provided in accordance with the present invention is a polyamide which has been prepared by anionically polymerizing a lactam monomer in the presence of a Grignard catalyst and an initiator system as has been set forth above. The polyamide can be processed into, for example, fibrous or pellet form for later use, for example, one component injection molding.

DETAILED DESCRIPTION OF THE INVENTION

The catalyst and initiator composition for lactam polymerization of the present invention broadly comprises (A) an initiator system and (B) a Grignard catalyst for lactam polymerization.

The initiator system is comprised of two components, the first being (a) at least one material containing the following initiator group:

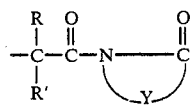

The aforesaid group is termed an imide group for the purpose of this application. The second component of the initiator system is (b) at least one material containing the following initiator group:

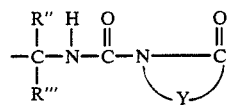

this group is termed a ureimide group for the purposes of this application. Both the imide and ureimide groups function as initiator groups for lactam polymerization. In the above structures R, R', R", R''' can be independently hydrogen, a $C_1$ to $C_{10}$ aliphatic radical, $C_3$ to $C_{10}$ cycloaliphatic radical, $C_6$ to $C_{10}$ aryl or alkaryl radical, and independently R and R" and the carbon to which each is attached are included as part of a cycloaliphatic or aromatic ring. Y can be an alkylene group having from 3 to 12 carbon atoms or an alkylene group having from 3 to 12 carbon atoms interrupted by a heteroatom. Examples of heteroatoms include oxygen, nitrogen, and the like. In one preferred embodiment, independently R and R" and the carbon to which each is attached are included as part of a cycloaliphatic or aromatic ring. It is also preferred that Y be an alkylene group having from 3 to 12 carbon atoms. In the initiator system at least a portion of either or both of the materials (a) or (b) is a polymeric material. Thus, one can have a variety of combinations with respect to the components of the initiator system. It should be understood that irrespective of the combination chosen at least 10 percent of the initiator groups of the initiator system must be of the (a) type, i.e., imide type. This percentage can be calculated in the following manner. First, determine the weight of initiator (a) and multiply by a factor which is the molecular weight (MW) of

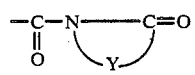

moieties in (a) divided by the MW of initiator (a), i.e.,

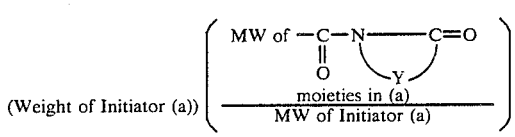

The product is equal to the weight of

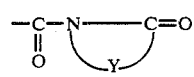

moieties in (a). Second, determine the weight of initiator (b) and multiply by a factor which is the MW of

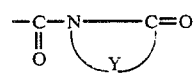

moieties in (b) divided by the MW of initiator (b), i.e.,

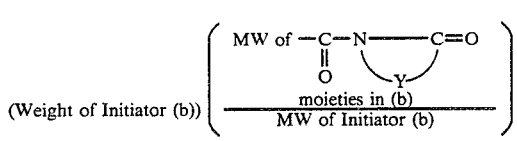

This product is equal to the weight of

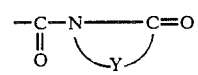

moieties in (b).

Finally, the percentage of initiator groups of the initiator system which are of the (a) type is determined by dividing the molecular weight of

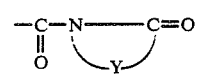

moieties in (a) by the sum of the molecular weight of

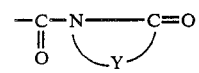

moieties in (a) and the molecular weight of

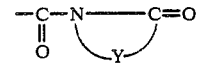

moieties in (b), i.e.,

Percentage of initiator groups in initiator system of (a) type = 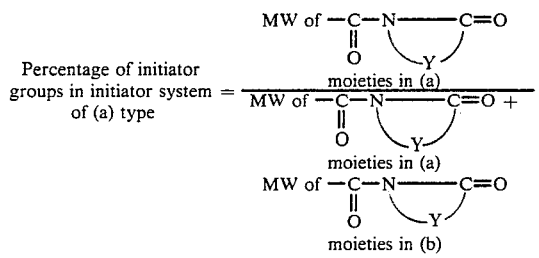

Moreover, the equivalent ratio of

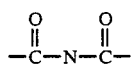

groups in the initiators to the magnesium of the Grignard catalyst should be within the range of from 0.3 to 1 to 4 to 1, preferably 0.8 to 1 to 2 to 1. For the purposes of this ratio, each magnesium atom is considered to have an equivalency of one.

For the purpose of this application a polymeric material is a macromolelcule formed by the chemical union of two or more coreactants and having at least three repeating structural units. Therefore, as polymer is defined herein it is meant to include trimers, tetramers, etc., which are collectively known as oligomers. Typically, the polymeric materials of the present inventin have an end group calculated molecular weight of at least 500, generally from 500 to 5,000,000. More usually the polymeric material has an end group calculated molecular weight ranging from 1000 to 50,000, preferably from 1600 to 30,000.

The polymeric initiator component is preferably prepared by reacting together an NCO-prepolymer and a lactam monomer of the following structural formula:

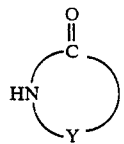

wherein Y is as defined above. Examples of suitable lactams include epsiloncaprolactam, valerolactam, 2-pyrrolidinone, and 2-azocyclotridecanone. Pref erably epsilon-caprolactam is utilized. The NCO-prepolymer can be derived from the reaction of a polymeric polyol with a hydroxyl number ranging from 5 to 70 and a calculated molecular weight within the limits set forth above and an organic polyisocyanate. Any number of polymeric polyols are useful however "soft" polyols are more preferred since they serve as plasticizers. Among the suitable polymeric polyols which are useful herein are polyether polyols and polyester polyols. The NCO-prepolymer can also be derived from other active hydrogen-containing materials such as diamines or dimercaptans.

Polyester polyols are generally formed by the esterification of polyols with polycarboxylic acids or acid anhydrides. The polyols conventionally employed in making the polyester polyols include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene) glycol, and similar type compounds. Other diols of various types and polyols of higher functionality can also be used. Such higher polyols include trimethylpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the abovedescribed polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, suberic, 2-methylsuccinic, 3,3-diethylglutaric, 2,2-dimethylsuccinic acid and trimellitic acid. Anhydrides of these acids where they exist can also be employed and are encompassed by the term "carboxylic acid".

Polyester polyols can also be made from the reaction of a lactone with a polyol. The lactones, commercially available, are represented by the structure:

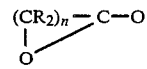

wherein n is from 2 to 9 and the R's are hydrogen, alkyl, cycloalkyl, alkoxy, and single ring aromatic hydrocarbon radicals. The preferred lactone is the epsilon-caprolactone where n equals 5. Polyols, such as the above-described diols and triols are used in the reaction with the lactone.

Examples of polyether polyols are polyalkylene ether polyols which include those having the following structural formula:

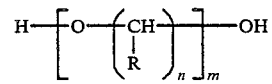

where the substituent R is hydrogen or lower alkyl containing from 1 to 5 carbon atoms including mixed substituents, n is an integer of at least 2, preferably from 2 to 6 and m is an integer of at least 2, preferably from 40 to 100. Included are poly(oxytetramethylene) glycols, poly(oxethylene) glycols, poly(oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, and bisphenol A, or other higher polyols, such as trimethylolpropane and pentaerythritol. Polyols of higher functionality which can be utilized as indicated can be made, for instance, by oxyalkylation of compounds such as sorbitol of sucrose. One commonly utilized oxyalkylation method is by reacting a polyol with an alkylene oxide, for example, ethylene or propylene oxide, in the presence of an acidic or basic catalyst.

The organic polyisocyanate which is suitable for use herein can be any hydrocarbon isocyanate, substituted or unsubstituted, including aliphatic polyisocyanates, cycloaliphatic polyisocyanates or aromatic polyisocyanates. Preferably a diisocyanate is employed, although higher polyisocyanates such as 1,2,4-benzene triisocyanate and polymethylene polyphenyl isocyanate, can be utilized as a part of the polyisocyanate.

Among useful polyisocyanates are ethylene diisocyanate, 1,2-diisocyanatopropane, 1,3-diisocyanatopropane, 1,6-diisocyanatohexane, 1,4-butylene diisocyanate, 1,6-hexamethylene diisocyanate, lysine diisocyanate, 1,4-methylene bis (cyclohexyl isocyanate), isophorone diisocyanate, toluene diisocyanate, meta-xylenediisocyanate, para-xylene-diisocyanate, 4-chloro-1,3-phenylene diisocyanate, 1,5-tetrahydro-naphthalene diisocyanate, and 4,4'-dibenzyl diisocyanate. There can also be employed isocyanate terminated adducts of diols such as ethylene glycol, 1,4-butylene glycol, polyalkylene glycols, and the like. These are formed by reacting more than one equivalent of a diisocyanate, such as those listed above, with one equivalent of a diol to form a longer chain diisocyanate.

In preparing the NCO-prepolymer the NCO to OH equivalent ratio of the polyisocyanate and polymeric polyol is at least 1.1 to 1 and generally varies within the range of from 1.2 to 2:1.

Besides the aforedescribed polymeric materials, polybutadiene can also be useful herein. Also, copolymers of polybutadiene with other polymerizable monomers such as acrylonitrile. For example, in one embodiment the (a) component is an imide-containing polybutadiene polymer while the (b) component is a ureimide-containing polyether as has been described immediately above. The imide-containing polybutadiene can be prepared by art-recognized methods. In this connection reference is made to U.S. Pat. No. 3,136,738 said disclosure being incorporated by reference herein.

A non-polymeric component, i.e., compound, of the initiator system is a substance or material composed of two or more elements in chemical combination which do not contain more than two repeating structural units. The non-polymeric materials useful herein have an end group calculated molecular weight of less than 500 and preferably from 252 to 450. In one preferred embodiment this component contains two imide groups. The aforesaid preferred non-polymeric material can be prepared from a dicarboxylic acid chloride having from 4 to 20 carbon atoms and a lactam monomer of the formula

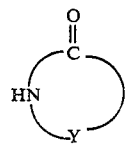

wherein Y is as defined previously. Suitable lactams have also been set forth above, with the preferred lactam being epsilon-caprolactam.

The end group calculated molecular weights can be determined by well-known methods. For example, the end group calculated molecular weight of the polymeric component which has been prepared from a polyol can be determined from the hydroxyl content and functionality of the polyol.

Examples of suitable dicarboxylic acid chlorides include adipoyl chloride, malonyl chloride, succinoyl chloride, glutaroyl chloride, glutaconoyl chloride, pimeloyl chloride, phthaloyl chloride, terephaloyl chloride, azeloyl chloride and isophthaloyl chloride. Preferably terephthaloyl chloride and azeloyl chloride are utilized.

In the aforementioned preferred embodiment wherein the nonpolymeric material contains two imide groups, the non-polymeric material can be represented by the following structural formula:

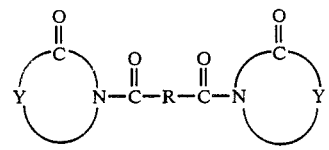

where Y is as defined above; and R is a divalent radical such as a hydrocarbon radical.

Examples of suitable non-polymeric materials include terephthaloyl bis-caprolactam, azeloyl bis-caprolactam, adipoyl bis-caprolactam, isophthaloyl bis-carolactam, malonyl bis-pyrrolidinone, succinoyl bis-pyrrolidinone. Preferably terephthaloyl bis-caprolactam and azeloyl bis-caprolactam are utilized.

When present the amount of non-polymeric component in the initiator system of the present invention depends upon the amount of polymeric component, Grignard catalyst, and the rate of polymerization required. In the embodiment wherein the initiator system comprises a polymeric and non-polymeric component, usually the non-polymeric component is present in an amount ranging from 0.1 to 10 mole percent, preferably from 1 to 5 mole percent based upon the polymerizable lactam. The polymeric component is usually present in an amount ranging from 1 to 50 percent by weight, preferably 10 to 30 percent, these percentages based upon the total weight of components A and B.

The Grignard catalyst useful herein is is meant to include any magnesium-containing catalyst, for example, those which can be prepared by reacting together a Grignard reagent and a lactam such as those listed above. Again, the preferred lactam is epsilon-caprolactam. Also useful herein are those Grignard catalysts which can be prepared by reacting together a Grignard reagent and an amide such as N-methyl acetamide. Preferably, the Grignard catalyst is prepared from Grignard reagent and lactam.

Suitable Grignard reagents include a large variety of materials which are commercially available, for example, allyl magnesium chloride; benzyl magnesium chloride; n-butyl magnesium chloride; sec-butyl magnesium chloride; p-chlorophenyl magnesium chloride, cyclohexyl magnesium chloride, ethyl magnesium chloride, isopropyl magnesium chloride, methyl magnesium chloride, phenyl magnesium chloride, n-propyl magnesium chloride, o-tolyl magnesium chloride, vinyl magnesium chloride; ethyl magnesium bromide, methyl magnesium bromide and n-octyl magnesium chloride. Preferably ethyl magnesium bromide and methyl magnesium bromide are utilized.

The preferred Grignard catalyst can be formed in situ by reacting the Grignard reagent with the lactam monomer in the polymerization medium or by prior reaction of these materials. If the catalyst is formed in situ provision must be made to remove associated solvent and by-product.

The amount of Grignard catalyst utilized in the catalyst and initiator composition varies within the range of from 0.1 mole percent to 10 mole percent, the percentages being based upon the total amount of lactam present in the composition.

The catalyst and initiator composition for lactam polymerization of the present invention is a two-package system. For example, in one embodiment one package contains the initiator system which is comprised of a ureimide-containing polymeric component in conjunction with a compound having two imide groups. The other package contains the Grignard catalyst in a slight excess of lactam monomer. For use in Reaction Injection Molding (RIM), for example, molten lactam monomer is charged to the reservoir tanks for both sides. To one side is added a measured quantity of the aforesaid initiator system which immediately prior to use has been solubilized in excess lactam monomer; to the other side is added a measured quantity of the Grignard catalyst which is solubilized in excess lactam. Additives such as fillers, reinforcements, antioxidants, surfactants, foam stabilizers, pigments, mold release agents and the like can be added to either side. Once the components have been charged to the respective reservoirs RIM molding may be carried out in the conventional fashion. That is, the polymerizable composition is formed in the mold by bringing into intimate contact the two components described above. The components can be contacted by mechanical mixing, impingement mixing or other methods. The temperature for RIM polymerization can vary depending upon the ingredients utilized in the polymerization system. Generally temperatures utilized range from 100° C. to about 250° C., preferably 135° C. to 155° C. The time required for RIM polymerization can also vary depending upon the specific ingredients utilized, however, the time required ranges from about 20 seconds to 10 minutes, usually 1 to 2 minutes.

In one embodiment of the present invention the aforedescribed catalyst and initiator system can be added to lactam monomer in a batch process, thereby forming a polymerizable composition. This can be done, for example, by initially charging molten lactam to a suitable reactor vessel and subsequently adding a measured amount of the aforesaid initiator package. Additives such as have been mentioned above can also be added at this juncture. Immediately prior to polymerization a measured quantity of the Grignard catalyst which is solubilized in lactam monomer is added to the vessel and anionic polymerization is carried out by heating at a temperature above the melting point of the resulting product. The resultant polymerized product, i.e., polyamide, can be processed into, for example, fibrous or pellet form for later use in one component injection molding, compression molding or transfer molding. It should be understood that the aforesaid batch polymerization method is not to be construed as limiting since the components can be added in any order so long as all of the components are not present together in the reactor vessel until the time that the actual polymerization is to be carried out.

One component injection molding is carried out by forcing the polymerized composition, i.e., the polyamide, under pressure from a holding chamber or reservoir through a feeding channel into the cavity of an injection mold. The polymerized composition is then subjected to both heat and pressure to form a molded article.

In compression molding or transfer molding the polymerized composition is charged to a mold cavity and sufficient heat and pressure is applied to form a molded article.

The novel catalyst and initiator composition of the present invention has a fundamental aspect the presence of dual initiators for anionic lactam polymerization in conjunction with a Grignard catalyst. Although not desiring to be bound by any theory, it is believed that the polymeric portion of the initiator system functions as a modifier for the polyamide in order to achieve the desirable property of impact resistance. Since the polymer utilized is preferably a "soft" material it serves as a plasticizer for the polyamide which forms from each of its initiating imide or ureimide groups.

As a result of the dual initiators many advantages ensue, including rapid cure, substantially complete reaction of lactam monomer, good stiffness, impact resistance, reduced odor and heat sag resistance. Overall, the dual initiator and Grignard catalyst composition results in an efficient economical process of lactam polymerization with improved properties in the final product.

The invention will be further described in connection with the examples which follow. These examples are given as illustrative of the invention and are not to be construed as limiting it to their details.

EXAMPLE I

This example illustrates the preparation and molding of a composition of the present invention.

| Components of the Composition | Percentage of Components in Composition Less Reinforcement (weight percent) | Mole Percent Active Group on Total Lactam Content After Mixing |
| --- | --- | --- |
| Catalyst Side[A] | | |
| Epsilon-caprolactam | 45.2 | |
| Caprolactam magnesium bromide[1] (catalyst) | 4.8 | 3.2 |
| Initiator Side[B] | | |
| Epsilon-caprolactam | 26.6 | |

| Components of the Composition | Percentage of Components in Composition Less Reinforcement (weight percent) | Mole Percent Active Group on Total Lactam Content After Mixing |
|---|---|---|
| Polymeric initiator precursor[2] | 21.2 | 1.4 |
| Terephthaloyl bis caprolactam[3] (initiator) | 2.2 | 1.9 |
| 1/16 inch milled fiberglass reinforcement[4] | 18 percent by weight on resin mix | |

(1) This anionic catalyst for lactam polymerization was prepared from epsilon-caprolactam and ethyl magnesium bromide in ether resulting in a composition containing 90.4 percent epsilon-caprolactam and 9.6 percent caprolactam magnesium bromide, all percentages by weight. Initially the lactam was charged to a reactor vessel and heated in vacuo to a temperature of 105° C. for one hour. Subsequently the ethyl magnesium bromide was added and heating was continued in vacuo for an additional hour at a temperature of 110° C. The resultant reaction mixture contained free epsilon-caprolactam and caprolactam magnesium bromide catalyst.

(2) This polymeric initiator precursor was prepared from 90.25 percent of PLURONIC L-121 (a hydroxyl-terminated poly(oxyalkylene) derivative of propylene glycol commercially available from BASF-Wyandotte Corp.), 9.75 percent of isophorone diisocyanate, and a trace amount (about 0.02 percent by weight) of dibutyltin dilaurate.

(3) This non-polymeric initiator was prepared from, all percentages by weight, 59 percent epsilon-caprolactam, 21 percent pyridine, and 20 percent terephthaloyl chloride. Initially, the solid epsilon-caprolactam was charged to a reactor vessel and heated to a temperature of 80°-100° C. to melt it. This melted caprolactam was then held in vacuo for 30 minutes followed by the addition of pyridine over a five minute period. The terephthaloyl chloride was then added to the aforesaid mixture over a period of 1.5 hours, heated to a temperature of 140° C. and held at this temperature for two hours. Subsequently this reaction mixture was poured into approximately six liters) of ice water and left to stand overnight. This mixture was then separated, washed three times with equal volumes of deionized water and once with methanol. Finally the washed product was dried at 75° C. for two hours.

(4) This 1/16 inch milled fiberglass is commercially available from Owens-Corning Fiberglas Corp. as 737 AA.

(A) The catalyst side was a mixture of free epsilon-caprolactam and caprolactam magnesium bromide catalyst.

(B) The initiator side was prepared by initially charging the lactam to a reactor vessel and heating it in vacuo for forty minutes at 85° C. To this melted caprolactam was added the terephthaloyl bis caprolactam and subsequently the polymeric initiator precursor. Heating was continued in vacuo for an additional 75 minutes at the same temperature. The resultant reaction mixture contained epsilon-caprolactam, terephthaloyl bis caprolactam with terminal imide groups, and polymeric polyether initiator with terminal ureimide groups.

The components stated above were molded in a 1/8 inch chrome plated plate mold made from two 5/16 inch chrome plated steel plates sandwiching a 1/8 inch U-shaped TEFLON gasket. The mold as well as the resin components were preheated prior to molding, the mold to a temperature of 150° C. and the resins to a temperature of 100° C. Prior to molding a mold release agent was applied to the mold surface. (ECCOSLIP 122S commercially available from Emerson & Cuming, diluted in an equal volume mixture of methyl ethyl ketone, toluene and Rule 66 VM&P Naphtha.

At the time of molding, 100 grams of the catalyst side were weighed into a vessel containing 100 grams of the initiator side, which had been mixed with 43.9 grams of Fiberglass reinforcement. These component mixtures were stirred together for a period of about 30 seconds, poured into the mold, and cured for three minutes at a temperature of 150° C. The molded panel was then removed from the mold. The panel cured well, and exhibited excellent stiffness and surface quality.

EXAMPLE II

This example illustrates the preparation and molding of an additional embodiment of the present invention.

| Components of the Composition | Percentage of Components in Composition Less Reinforcement (weight percent) | Mole Percent Active Group on Total Lactam Content After Mixing |
|---|---|---|
| Catalyst Side[A] | | |
| Epsilon-caprolactam | 47.8 | |
| Caprolactam magnesium bromide (catalyst) | 2.2 | 1.6 |
| Initiator Side[B] | | |
| Epsilon-caprolactam | 20.0 | |
| Polymeric initiator precursor[1] | 5.0 | 0.2 |
| Imide-containing polybutadiene having molecular weight of 3650 (initiator) | 25.0 | 2.0 |
| 1/16 inch milled fiberglass reinforcement[2] | 10 percent by weight on resin mix | |
| 1/64 inch treated flake glass reinforcement[3] | 10 percent by weight on resin mix | |

[1]This polymeric initiator precursor was prepared from 91.9 percent of PLURONIC L-121 (a hydroxyl-terminated poly(oxyalkylene) derivative of propylene glycol, commercially available from BASF-Wyandotte Corp.) 8.1 percent of isophorone diisocyanate, and a trace amount (about 0.02 percent by weight) of dibutyltin dilaurate).
[2]As in Example I, above.
[3]This flaked glass reinforcement was prepared by slurrying commercially available 1/64 inch flaked glass (available from Owens Corning Fiberglass Corp.) in a solution of gamma-aminopropyltriethoxysilane and methanol followed by oven drying.
[A]The catalyst side was a mixture of free epsilon-caprolactam and caprolactam magnesium bromide catalyst.
[B]The initiator side was prepared by initially charging the lactam to a reactor vessel and heating it in vacuo for 40 minutes at 96° C. to 108° C. To this melted caprolactam was added the polybutadiene initiator and subsequently the polymeric initiator precursor. Heating was continued in vacuo for 30 minutes at 102° C. to 107° C. The resultant reaction mixture contained epsilon-caprolactam, polymeric polyether initiator with terminal ureimide groups and polymeric polybutadiene initiator with terminal imide groups.

The aforesaid composition was molded in the manner described in Example I, above. However, 25 grams of each type of reinforcement were premixed into the 100 grams of the initiator side. The panel cured well and exhibited excellent stiffness and good impact resistance.

COMPARATIVE EXAMPLE
EXAMPLE III

This example illustrates the preparation and molding of a polycaprolactam composition.

| Components of the Composition | Percentage of Components in Composition Less Reinforcement (weight percent) | Mole Percent Active Group on Total Lactam Content After Mixing |
|---|---|---|
| Catalyst Side | | |
| Epsilon-caprolactam | 45.2 | |
| Caprolactam magnesium bromide[1] (catalyst) | 4.8 | 3.2 |
| Initiator Side | | |
| Epsilon-caprolactam | 26.6 | |
| Terephthaloyl bis caprolactam[2] (initiator) | 2.2 | 1.9 |
| PLURONIC L-121[3] | 21.2 | |
| 1/16 inch milled fiberglass reinforcement[4] | 18 percent by weight on resin mix | |

(1) Prepared as in Example I, above.
(3) Prepared as in Example I, above
(3) A hydroxyl-terminated poly(oxyalkylene) derivative of propylene glycol commercially available from BASF-Wyandotte Corp.
(4) As in Example I, above.

The aforesaid composition was molded in the manner described in Example I, above. That is, at the time of molding 100 grams of the catalyst side were mixed with 100 grams of the initiator side which had been mixed with the fiberglass reinforcement. These were then mixed, molded, and cured in the same manner described in Example I, above. The molded panel had not cured well and in addition exhibited poor stiffness and surface quality.

Although the invention has been described with specific references and specific details of embodiments thereof, it is to be understood that it is not intended to be so limited since changes and alterations therein may be made by those skilled in the art which are within the full intended scope of this invention as defined by the appended claims.

What is claimed is:

1. In a method of molding, comprising:
(I) depositing in a mold a charge of a polymerizable composition, comprising lactam monomer, initiator, and catalyst;
(II) polymerizing the charge while in the mold so as to form an at least partially cured article;
(III) removing the article from the mold, wherein the improvement comprises utilizing as the initiator and catalyst components a Grignard catalyst for lactam polymerization and an initiator system comprising:
(a) at least one material represented by the following structural formula:

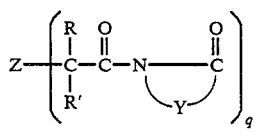

(b) at least one material represented by the following structural formula:

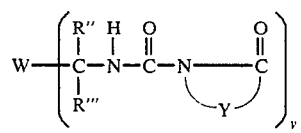

wherein q and v are independently an integer of at least 1; Z and W are independently selected from a compound or polymeric material, said compound being composed of at least two elements in chemical combination which contain up to two repeating structural units, said polymeric material being a macromolecule formed by the chemical union of at least two coreactants and having at least three repeating structural units; with the proviso that at least a portion of either or both the materials (a) or (b) is a polymeric material; R, R', R", R''' are independently hydrogen, a $C_1$ to $C_{10}$ aliphatic radical, $C_3$ to $C_{10}$ cycloaliphatic radical, $C_6$ to $C_{10}$ aryl or alkaryl radical, and independently R and R" and the carbon to which each is attached are included as part of a cycloaliphatic or aromatic ring; and Y is an alkylene group having from 3 to 12 carbon atoms or an alkylene group having from 3 to 12 carbon atoms interrupted by a heteroatom; with the proviso that the equivalent ratio

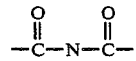

groups to the magnesium of the Grignard catalyst is within the range of from 0.3 to 1 to 4 to 1, and at least 10 percent of the initiator groups of the initiator system are of the (a) type.

2. The method of claim 1 wherein Y is an alkylene group having from 3 to 12 carbon atoms.

3. The method of claim 2 wherein the material of (b) is a polymer prepared from an NCO-prepolymer and a lactam monomer.

4. The method of claim 3 wherein the NCO-prepolymer is derived from a polyether polyol.

5. The method of claim 3 wherein the material of (a) is a polybutadiene.

6. The method of claim 2 additionally containing a lactam monomer of the following formula, thereby forming a polymerizable composition:

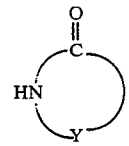

wherein Y is an alkylene group having 3 to 12 carbon atoms.

7. The method of claim 2 wherein the Grignard catalyst is prepared by reacting together a Grignard reagent and a lactam monomer of the following structural formula:

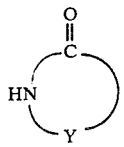

wherein Y is an alkylene group having 3 to 12 carbon atoms.

8. The method of claim 7 wherein the Grignard reagent is selected from ethyl magnesium bromide or methyl magnesium bromide.

9. The method of claim 2 wherein (a) is selected from terephthaloyl bis caprolactam or azeloyl bis caprolactam.

10. A polymerizable composition comprising:
(I) a lactam monomer of the following structural formula:

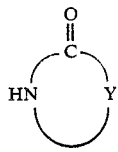

(II) an initiator system comprised of:
(a) at least one material represented by the following structural formula:

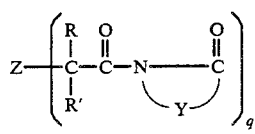

(b) at least one material represented by the following structural formula:

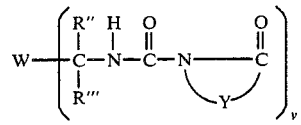

wherein q and v are independently an integer of at least 1; Z and W are independently selected from a compound or polymeric material, said compound being composed of at least two elements in chemical combination which contain up to two repeating structural units, said polymeric material being a macromolecule formed by the chemical union of at least two coreactants and having at least three repeating structural units; with the proviso that at least a portion of either or both the materials (a) or (b) is a polymeric material; R, R', R'', R''' are independently hydrogen, a $C_1$ to $C_{10}$ aliphatic radical, $C_3$ to $C_{10}$ cycloaliphatic radical, $C_6$ to $C_{10}$ aryl or alkaryl radical, and independently R and R'' and the carbon to which each is attached are included as part of a cycloaliphatic or aromatic ring; and Y is an alkylene group having from 3 to 12 carbon atoms or an alkylene group having from 3 to 12 carbon atoms interrupted by a heteroatom; with the proviso that the equivalent ratio

groups to the magnesium of the Grignard catalyst is within the range of from 0.3 to 1 to 4 to 1, and at least 10 percent of the initiator groups of the initiator system are of the (a) type.

11. The composition of claim 10 wherein the lactam monomer is epsilon-caprolactam.

* * * * *

UNITED STATES PATENT AND TRADEMARK OFFICE
CERTIFICATE OF CORRECTION

PATENT NO. : 4,599,398
DATED : July 8, 1986
INVENTOR(S) : Robert B. Hodek and Jerome A. Seiner It is certified that error appears in the above-identified patent and that said Letters Patent are hereby corrected as shown below:

In Claim 1, column 14, line 30, insert "of" after "ratio".

In Claim 6, column 14, line 52, insert "structural" between "following" and "formula".

In Claim 10, column 16, line 27, insert "of" after "ratio".

Signed and Sealed this

Twenty-first Day of April, 1987

Attest:

DONALD J. QUIGG

Attesting Officer

Commissioner of Patents and Trademarks